Patented Nov. 21, 1933

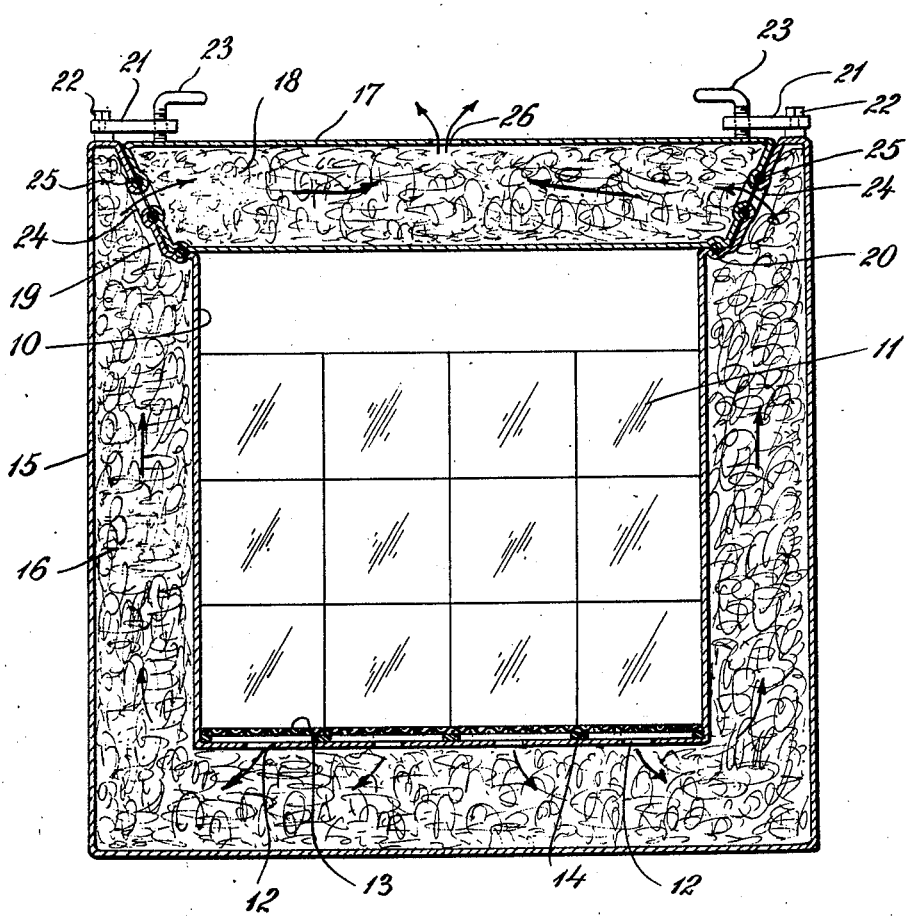

1,936,214

UNITED STATES PATENT OFFICE 1,936,214

CONTAINER

Howard A. Sommers, Saltville, Va., assignor to The Mathieson Alkali Works, Inc., New York, N. Y., a corporation of Virginia Application May 23, 1931. Serial No. 539,510

10 Claims. (Cl. 220—9)

This invention relates to the distribution and storage of solid carbon dioxide and is concerned more particularly with a novel container for that purpose so constructed as to afford increased protection to the contents against heat transmitted through the container walls. My new container is of the insulated type and I have taken advantage of the peculiar properties of solid carbon dioxide in the disposition of the insulation and the outflow of the gas evolved, when the solid carbon dioxide sublimes, to increase the efficiency of the insulation.

As is well known, carbon dioxide cannot exist as a liquid at atmospheric pressure and when the gas is liquefied and the pressure released, a part of the liquid is converted into a solid which, under proper conditions, may be a relatively dense coherent ice. That material is now widely used as a refrigerant and by reason of its low temperature, about —109° F., and its conversion directly from a solid into a gas, it is superior to water ice for many purposes. The cold gaseous carbon dioxide which results from the sublimation of the ice is considerably heavier than air and in the container of my invention, I employ this cold evolved gas to form a protective envelope and to provide insulation for the ice additional to fibrous insulation with which the container is equipped.

My new container may be made in various shapes and sizes and of a variety of materials, but I prefer to make it of square or rectangular section and to use a sheet metal, such as steel, for the walls. The walls are made double with a loose insulating material between them and the joints of the walls are welded so as to be gas tight. I find that kapok offers numerous advantages as an insulator in such a container and I fill the walls with that material and provide the container with escape vents for the evolved gas so arranged that the dry cold gas resulting from the sublimation of the solid flows through the fibrous material to the atmosphere, displacing air from the mass of insulation and keeping the insulation cold. Preferably the inner chamber of the container is provided with a plurality of openings at the bottom through which the gas escapes into the body of insulating material between the walls and the gas flows upwardly through the vertical walls of the container and across the top to a vent opening through the outer wall to the atmosphere. The container is provided with a readily removable cover which may be held tightly in position so as to prevent leakage and the cover is of double walled construction and contains insulation. The gas flowing through the vertical walls enters the mass of insulation in the cover and flows across the container to the vent to atmosphere which may be disposed centrally of the cover.

For a better understanding of the invention, reference may be had to the accompanying drawing in which the single figure illustrates one form of my new container in cross-section.

The container illustrated in the drawing is of square section but the container may have any other suitable shape, as desired. The container comprises an inner chamber 10 in which the masses of solid carbon dioxide shown as cubes 11 are placed. The bottom of the inner chamber is provided with a plurality of vent openings 12 and above these vent openings is disposed a grating 13 supported a short distance above the chamber bottom on suitable supports 14.

The container has an outer wall 15, and the walls of the inner chamber and the outer wall are made of sheet metal, preferably with welded seams so as to make a gas tight shell. Between the inner and outer walls of the container, I place a mass of insulation 16 and this body of insulation may be of considerable thickness, for example, from 8 to 12 inches. The insulation I have found particularly useful is kapok, that material being of low density and high insulating efficiency.

At its upper end, the container is open and it is provided with a hatch cover 17 of double walled sheet metal construction having a mass of insulation 18 between the two walls thereof. The cover is to be secured in place so as to form a gas tight enclosure and for this purpose, the walls of the inner chamber of the container may have outwardly and upwardly inclined portions 19 forming a seat for the beveled edge of the cover. To make the cover gas-tight the cover is seated upon a rubber gasket 20 which surrounds the top opening. The cover is held in position in any convenient manner as, for example, by swinging arms 21 bolted at 22 to the container and provided with screws 23 which bear on the cover and force it against the gasket.

The gas evolved by sublimation of the carbon dioxide ice passes down through the vents 12 in the bottom of the inner wall of the container into the mass of insulation and then flows upwardly through the insulation in the vertical walls of the container. Vents 24 are formed in the hatch cover seat and also in the bevelled wall of the cover, these openings being surrounded by rubber gaskets 25 so that the gas flowing up through the vertical walls of the container may pass into the inner space between the walls of the cover, the gaskets 25 preventing escape of the gas to the atmosphere. In the top wall of the cover is a central vent 26 through which the gas escapes to the atmosphere.

It will be apparent that with the construction described, the cold heavy carbon dioxide gas evolved in the inner chamber of the container flows downwardly into the mass of insulation, then upwardly through the insulation in the side walls of the container, and then through the body of the insulation in the cover before it can escape to the atmosphere. The gas has a temperature of −109° F. at its lowest and is extremely dry. The passage of the gas through the insulation consequently increases the efficiency of the latter since it drives out the air contained between the fibres. The gas forms an intensely cold envelope which completely encloses the inner chamber of the container and heat which penetrates through the outer wall of the container acts only to raise the temperature of the escaping gas and is largely prevented from being transmitted through the insulation and the inner wall of the carbon dioxide ice. In the new container, therefore, I provide not only the ordinary insulation but increase the efficiency of this insulation by means of the escaping gas and also utilize the gas as a protective envelope to prevent the transfer of the heat through the container walls to the contents.

I claim:

1. In a refrigerating container for solid carbon dioxide, a pair of concentric shells, said inner shell being of continuous metal construction and having an open top and other openings only at its bottom, said outer shell also being of continuous metal construction, a wall connecting the edges of said shells around said top opening and with said shells defining a chamber between said shells which is completely closed except for openings in said wall and said bottom openings in the inner shell, insulating material in said chamber, and a removable closure for said open top, said closure being hollow and filled with insulating material and having openings leading into its interior and registering with said openings in said wall when said closure is in operating position, said closure also having an opening in its outer wall spaced from said openings into its interior, whereby carbon dioxide gas evolved from the material in said inner container flows through the insulating material in said chamber and in said closure before escaping through said opening in the outer wall of said closure.

2. In a refrigerating container for solid carbon dioxide a pair of concentric shells forming all except a part of the top of said container, fibrous material between said shells and a removable section completing the top of said container and formed by an enclosing shell containing fibrous material, the bottom of said inner shell having openings for escape of carbon dioxide gas evolved from the material in said container into the fibrous material between said sheets, and said section having openings for receiving said gas from the space between said shells and discharging it into the atmosphere, said gas being prevented from escaping except after having passed through the fibrous material between said shells and within said section.

3. In a refrigerating container, a pair of concentric shells forming all except a part of the top of said container, fibrous material between said shells having gaseous carbon dioxide in the voids thereof, an insulating section completing the top of said container and formed by an enclosing shell containing fibrous material and gaseous carbon dioxide, the inner of said concentric shells having an opening at the bottom thereof for allowing carbon dioxide from within the container to pass into the space between the shells, and said concentric shells and enclosing shell having communicating openings for allowing carbon dioxide gas to pass from between said concentric shells into said enclosing shell, said enclosing shell also having an opening for discharging the gas.

4. In a refrigerating container, a pair of concentric shells forming all except a part of the top of said container, fibrous material between said shells having gaseous carbon dioxide in the voids thereof, an insulating section completing the top of said container and formed by an enclosing shell containing fibrous material and gaseous carbon dioxide, the inner of said concentric shells having an opening at the bottom thereof for allowing carbon dioxide from within the container to pass into the space between the shells, and said concentric shells and enclosing shell having communicating openings for allowing carbon dioxide gas to pass from between said concentric shells into said enclosing shell, said enclosing shell also having an opening for discharging the gas, and sealing means surrounding said communicating openings for preventing the escape of gas therefrom.

5. In a refrigerating container, a pair of concentric shells forming all except a part of the top of said container, fibrous material between said shells having gaseous carbon dioxide in the voids thereof, an insulating section completing the top of said container and formed by an enclosing shell containing fibrous material and gaseous carbon dioxide, the inner of said concentric shells having an opening at the bottom thereof for allowing carbon dioxide from within the container to pass into the space between the shells, and said concentric shells and enclosing shell having communicating openings for allowing carbon dioxide gas to pass from between said concentric shells into said enclosing shell, said enclosing shell also having an opening for discharging the gas, and sealing means surrounding said communicating openings and the opening closed by said enclosing shell for preventing the escape of gas therefrom.

6. In a refrigerating container, a pair of concentric shells forming all except a part of the top of said container, fibrous material between said shells having gaseous carbon dioxide in the voids thereof, an insulating section completing the top of said container and formed by an enclosing shell containing fibrous material and gaseous carbon dioxide, the inner of said concentric shells having an opening at the bottom thereof for allowing carbon dioxide from within the container to pass into the space between the shells, and said concentric shells and enclosing shell having communicating openings for allowing carbon dioxide gas to pass from between said concentric shells into said enclosing shell, said enclosing shell also having an opening for discharging the gas, and sealing means surrounding said communicating openings and the opening closed by said enclosing shell for preventing the escape of gas therefrom and clamping means for holding said enclosing shell in place.

7. In a refrigerating container a pair of concentric shells forming all except the top of the container, the tops of said concentric shells being joined by an outwardly sloping wall, an insulating section formed to fit against said sloping walls and close the top of said container, said insulating section comprising a hollow shell, fibrous material in said hollow shell and the space between said concentric shells, the inner of said concentric shells having an opening in the bottom thereof and said hollow shell and sloping wall having communicating openings therein, packing surrounding the communicating openings and the main opening of the container which is closed by the hollow shell, said hollow shell having an opening therein leading to the outside and means for clamping said hollow shell against said packing.

8. In a refrigerating container a pair of concentric shells forming all except the top of said container, said inner shell having an outwardly extending flange at the top thereof, sloping walls connecting said outwardly extending flange and said outer wall to form a completely enclosed space between said shells, a hollow enclosing shell formed to fit against said flange and said outwardly sloping walls to close the container formed inside said inner shell, an opening at the bottom of said inner shell and at the top of said hollow enclosing shell and communicating openings in said hollow enclosing shell and said sloping walls, packing material surrounding said communicating openings and lying between said hollow shell and said flange, and fibrous material filling said hollow shell and lying between said concentric shells.

9. In a refrigerating container a pair of concentric shells forming all except the top of said containers, said inner shell having an outwardly extending flange at the top thereof, sloping walls connecting said outwardly extending flange and said outer wall to form a completely enclosed space between said shells, a hollow enclosing shell formed to fit against said flange and said outwardly sloping walls to close the container formed inside said inner shell, an opening at the bottom of said inner shell and at the top of said hollow enclosing shell and communicating openings in said hollow enclosing shell and said sloping walls, packing material surrounding said communicating openings and lying between said hollow shell and said flange, fibrous material filling said hollow shell and lying between said concentric shells, and clamping means for clamping said hollow shell in place.

10. In a container for solid carbon dioxide, the combination of a pair of telescoped open receptacles, a porous mass of insulating material in the space between the receptacles, a wall closing the space between the open ends of the receptacle, a double-walled closure for the open inner receptacle, and a porous mass of insulating material between the walls of said closure, the inner receptacle being connected to the space between the receptacles and the space between the receptacles being connected to the interior of said closure, whereby the gas evolved by solid carbon dioxide in the inner receptacle traverses the porous masses between the receptacles and the interior of said closure.

HOWARD A. SOMMERS.